United States Patent
Anand et al.

(10) Patent No.: US 9,628,385 B2
(45) Date of Patent: Apr. 18, 2017

(54) METHOD OF IDENTIFYING INTERNAL DESTINATIONS OF NETWORKS PACKETS AND AN APPARATUS THEREOF

(71) Applicant: CAVIUM, INC., San Jose, CA (US)

(72) Inventors: Vishal Anand, Saratoga, CA (US);
Tsahi Daniel, Palo Alto, CA (US);
Gerald Schmidt, San Jose, CA (US);
Premshanth Theivendran, Foster City, CA (US)

(73) Assignee: Cavium, Inc., San Jose, CA (US)

( * ) Notice: Subject to any disclaimer, the term of this patent is extended or adjusted under 35 U.S.C. 154(b) by 77 days.

(21) Appl. No.: 14/309,802

(22) Filed: Jun. 19, 2014

(65) Prior Publication Data

US 2015/0373166 A1 Dec. 24, 2015

(51) Int. Cl.
*H04L 12/741* (2013.01)
*H04L 12/743* (2013.01)
*H04L 29/06* (2006.01)

(52) U.S. Cl.
CPC ........ *H04L 45/745* (2013.01); *H04L 45/7453* (2013.01); *H04L 45/7457* (2013.01); *H04L 69/161* (2013.01); *H04L 69/22* (2013.01)

(58) Field of Classification Search
CPC . H04L 45/7453; H04L 45/7457; H04L 45/70; H04L 45/72; H04L 69/22; H04L 45/745
See application file for complete search history.

(56) References Cited

U.S. PATENT DOCUMENTS

| | | | |
|---|---|---|---|
| 5,781,729 A | 7/1998 | Baker et al. | |
| 5,805,808 A | 9/1998 | Hasani et al. | |
| 5,951,651 A * | 9/1999 | Lakshman | H04L 29/06 370/351 |
| 6,088,356 A * | 7/2000 | Hendel | H04L 49/602 370/392 |
| 6,341,129 B1 | 1/2002 | Schroeder et al. | |
| 6,606,301 B1 | 8/2003 | Muller et al. | |
| 6,789,116 B1 | 9/2004 | Sarkissian et al. | |
| 7,187,694 B1 | 3/2007 | Liao | |
| 7,359,403 B1 | 4/2008 | Rinne | |
| 7,367,052 B1 * | 4/2008 | Desanti | H04L 63/06 709/229 |
| 7,391,735 B2 | 6/2008 | Johnson | |
| 7,568,047 B1 | 7/2009 | Aysan et al. | |
| 7,606,263 B1 | 10/2009 | Parker | |
| 7,710,959 B2 | 5/2010 | Ramasamy et al. | |
| 7,715,611 B2 | 5/2010 | Eaton et al. | |
| 7,822,032 B1 | 10/2010 | Parker et al. | |
| 7,903,689 B2 | 3/2011 | Niinomi et al. | |
| 8,031,640 B2 | 10/2011 | Mitsumori | |

(Continued)

*Primary Examiner* — Candal Elpenord
(74) *Attorney, Agent, or Firm* — Haverstock & Owens LLP

(57) ABSTRACT

Embodiments of the apparatus of identifying internal destinations of network packets relate to a network chip that allows flexibility in handling packets. The handling of packets can be a function of what the packet contents are or where the packets are from. The handling of packets can also be a function of both what the packet contents are and where the packets are from. In some embodiments, where the packets are from refers to unique port numbers of chip ports that the packets arrived at. The packets can be distributed for processing within the network chip.

31 Claims, 4 Drawing Sheets

(56) References Cited

U.S. PATENT DOCUMENTS

| | | | |
|---|---|---|---|
| 8,054,744 B1 | 11/2011 | Bishara et al. | |
| 8,112,800 B1 | 2/2012 | Yang et al. | |
| 8,144,706 B1* | 3/2012 | Daniel | H04L 49/354 370/389 |
| 8,576,173 B2 | 11/2013 | Verhaegh | |
| 8,705,533 B1 | 4/2014 | Venkatraman | |
| 8,804,733 B1* | 8/2014 | Safrai | H04L 49/10 370/392 |
| 9,313,115 B2 | 4/2016 | Kamerkar et al. | |
| 2001/0050914 A1* | 12/2001 | Akahane | H04L 12/4608 370/382 |
| 2002/0009076 A1* | 1/2002 | Engbersen | H04L 45/7457 370/389 |
| 2002/0016852 A1 | 2/2002 | Nishihara | |
| 2002/0062394 A1 | 5/2002 | Bunn et al. | |
| 2002/0076142 A1 | 6/2002 | Song | |
| 2002/0083210 A1 | 6/2002 | Harrison et al. | |
| 2002/0163935 A1 | 11/2002 | Paatela et al. | |
| 2002/0191521 A1 | 12/2002 | Minamino et al. | |
| 2003/0037154 A1 | 2/2003 | Poggio et al. | |
| 2003/0152078 A1 | 8/2003 | Henderson et al. | |
| 2003/0193949 A1 | 10/2003 | Kojima et al. | |
| 2003/0210702 A1 | 11/2003 | Kendall | |
| 2003/0218978 A1* | 11/2003 | Brown | G06F 17/30949 370/230 |
| 2003/0231625 A1* | 12/2003 | Calvignac | H04L 49/602 370/389 |
| 2004/0064589 A1 | 4/2004 | Boucher et al. | |
| 2005/0076228 A1 | 4/2005 | Davis | |
| 2005/0213570 A1 | 9/2005 | Stacy et al. | |
| 2005/0232303 A1 | 10/2005 | Deforche et al. | |
| 2005/0276230 A1* | 12/2005 | Akahane | H04L 12/2602 370/252 |
| 2005/0281281 A1 | 12/2005 | Nair et al. | |
| 2006/0039372 A1 | 2/2006 | Sarkinen et al. | |
| 2006/0168309 A1 | 7/2006 | Sikdar et al. | |
| 2006/0215695 A1 | 9/2006 | Olderdissen | |
| 2006/0280178 A1 | 12/2006 | Miller et al. | |
| 2007/0078997 A1 | 4/2007 | Stern | |
| 2008/0008159 A1 | 1/2008 | Bourlas et al. | |
| 2009/0067325 A1 | 3/2009 | Baratakke et al. | |
| 2009/0234818 A1 | 9/2009 | Lobo et al. | |
| 2009/0238190 A1 | 9/2009 | Cadigan, Jr. et al. | |
| 2010/0161787 A1 | 6/2010 | Jones | |
| 2010/0272125 A1 | 10/2010 | Franke et al. | |
| 2010/0329255 A1 | 12/2010 | Singhal | |
| 2011/0022732 A1 | 1/2011 | Hutchison et al. | |
| 2011/0058514 A1 | 3/2011 | Lee et al. | |
| 2011/0134920 A1 | 6/2011 | Dyke | |
| 2011/0142070 A1 | 6/2011 | Lim et al. | |
| 2011/0261698 A1 | 10/2011 | Kamerkar et al. | |
| 2011/0261812 A1 | 10/2011 | Kini et al. | |
| 2011/0268123 A1 | 11/2011 | Kopelman et al. | |
| 2011/0310892 A1 | 12/2011 | DiMambro | |
| 2012/0281714 A1 | 11/2012 | Chang et al. | |
| 2013/0039278 A1 | 2/2013 | Bouazizi et al. | |
| 2013/0163427 A1 | 6/2013 | Beliveau et al. | |
| 2013/0163475 A1* | 6/2013 | Beliveau | H04L 67/327 370/257 |
| 2013/0215906 A1 | 8/2013 | Hidai | |
| 2013/0238792 A1 | 9/2013 | Kind et al. | |
| 2014/0119231 A1 | 5/2014 | Chan et al. | |
| 2014/0153443 A1 | 6/2014 | Carter | |
| 2014/0269307 A1 | 9/2014 | Banerjee et al. | |
| 2014/0328354 A1 | 11/2014 | Michael | |
| 2014/0369365 A1 | 12/2014 | Denio et al. | |
| 2015/0081726 A1 | 3/2015 | Izenberg | |
| 2015/0189047 A1 | 7/2015 | Naaman et al. | |
| 2015/0222533 A1 | 8/2015 | Birrettella et al. | |
| 2015/0277911 A1 | 10/2015 | Khartikov et al. | |

* cited by examiner

| Layer0 | Layer1 | Layer2 | Layer4 | Layer5 | Layer6 | Layer7 |
|--------|--------|--------|--------|--------|--------|--------|
| ETHERNET | IPV4 | ICMP | | | | |
| ETHERNET | IPV4 | IGMP | | | | |
| ETHERNET | IPV4 | TCP | | | | |
| ETHERNET | IPV4 | UDP | | | | |
| ETHERNET | IPV4 | UDP | VxLAN | ETHERNET | | |
| ETHERNET | IPV4 | UDP | VxLAN | ETHERNET | ARP | |
| ETHERNET | IPV4 | UDP | VxLAN | ETHERNET | IPv4 | |

Fig. 1

METHOD OF IDENTIFYING INTERNAL DESTINATIONS OF NETWORKS PACKETS AND AN APPARATUS THEREOF

FIELD OF INVENTION

The present invention relates to network packets. In particular, the present invention relates to a method of identifying internal destinations of network packets and an apparatus thereof.

BACKGROUND OF THE INVENTION

Prior art switch chips parse and process incoming network traffic to decide where packets should be transmitted to. However, the prior art switch chips simply extract contents from a packet to determine an internal destination of the packet. Yet, handling of packets is not always a function of what the packet contents are.

BRIEF SUMMARY OF THE INVENTION

Embodiments of the apparatus of identifying internal destinations of network packets relate to a network chip that allows flexibility in handling packets. The handling of packets can be a function of what the packet contents are or where the packets are from. The handling of packets can also be a function of both what the packet contents are and where the packets are from. In some embodiments, where the packets are from refers to unique port numbers of chip ports that the packets arrived at. The packets can be distributed for processing within the network chip.

In one aspect, a method of implementing a network chip is provided. The method includes receiving a packet and identifying a unique packet identifier of the packet based on contents of the packet.

The method also includes forming a token from the contents of the packet. In some embodiments, identifying protocol layers of the packet includes expanding each of the protocol layers to a generic format based on the identification of the protocol layer, selecting contents from the expanded protocol layers, and concatenating the selected contents to form the token.

The method also includes determining a destination to send the token to, wherein the determination is based on two factors. In some embodiments, a destination includes forming a key based on a combination of the two factors, accessing a destination table, and using the key to retrieve information regarding the destination from the destination table.

In some embodiments, the destination is an internal destination on the network chip. In some embodiments, the destination is one of a plurality of LDEs on the network chip.

In some embodiments, one of the factors is what the contents of the packet are. In some embodiments, one of the factor is where the packet is from.

In some embodiments, a combination of the two factors allows all packets of a particular type to be sent to the same destination for processing irrespective of which chip ports the packets are from. In some embodiments, a combination of the two factors allows all traffic from one chip port to be redirected to the same destination for processing independent of what kind of traffic it is.

In another aspect, a method of implementing a network chip. The method includes processing a packet to identify a unique packet identifier of the packet based on contents of the packet and to form a token based on extracted header fields of the packet, and identifying an arrival chip port of the packet, wherein the arrival chip port is one of a plurality of chip ports on the network chip.

The method also includes forming a key by combining the unique packet identifier of the packet and certain bits of a port number corresponding to the identified chip port. In some embodiments, the port number is a relative port number that is assigned to the identified port. In some embodiments, the assignment is performed using a dynamic port renumbering scheme.

In some embodiments, the combination of the PktID and the certain bits of the port number is a concatenation of the PktID and the certain bits of the port number.

The method also includes determining a destination of the token based on the key. In some embodiments, determining a destination includes referencing a destination table and using the key to retrieve information regarding the destination from the destination table.

The method also includes forwarding the token to the destination.

In yet another aspect, a network chip is provided. The network chip includes a plurality of chip ports, wherein each of the ports is associated with a port number, and on-chip memory to store a destination table.

The network chip also includes a parser to process a packet that arrived at one of the plurality of chip ports to thereby identify a unique packet identifier of the packet and form a token that includes extracted fields from different protocol layers of the packet. The parser also decides where to send the token to, and forwards the token according to the decision. In some embodiments, the decision is based on referencing the destination table.

In some embodiments, the unique packet identifier and certain bits of the port number are concatenated to form a key to be used when retrieving destination information from the destination table.

In some embodiments, the destination table is programmable.

In some embodiments, the network chip also includes a mesh network of LDEs. In some embodiments, the token is in a format that is understood by the LDEs such that one or more of the LDEs will be able to process the token.

In some embodiments, each of the LDEs generates a lookup key and sends the lookup key to a remote search engine, wherein the remote search engine returns a lookup result that is used to modify the token. In some embodiments, the token is forwarded to a destination LDE, wherein the destination LDE is one of the LDEs. In some embodiments, the destination LDE modifies the token. In some embodiments, the modified token is forwarded to another LDE or the same LDE for further modification. In some embodiments, a final modified token is used to modify packet headers of the packet. In some embodiments, the modified packet headers are combined with a payload of the packet to form an output packet. In some embodiments, the output packet is sent back to the parser for further processing.

In yet another aspect, a network switch is provided. The network switch includes a plurality of switch ports and a network chip. The network chip includes a plurality of chip ports that is mapped to the plurality of switch ports, and a parser to determine how to handle to incoming packets, wherein the handling is a function of what contents of the packets are and where the packets are from such that two conditions are always met.

In some embodiments, one of the two conditions is all packets of a same packet type are sent to a first destination for processing irrespective of which of the plurality of chip ports the packets are from, and another of the two conditions is all traffic from one of the plurality of chip ports is redirected to a second destination for processing independent of what kind of traffic the traffic is.

In some embodiments, the parser processes a packet that arrived at one of the plurality of chip ports to thereby identify a unique packet identifier of the packet and form a token that includes extracted fields from different protocol layers of the packet.

In some embodiments, the parser further decides where to send the token to and forwards the token according to the decision.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates exemplary protocol layer combinations of packets.

DETAILED DESCRIPTION OF THE INVENTION

Figure 2A:
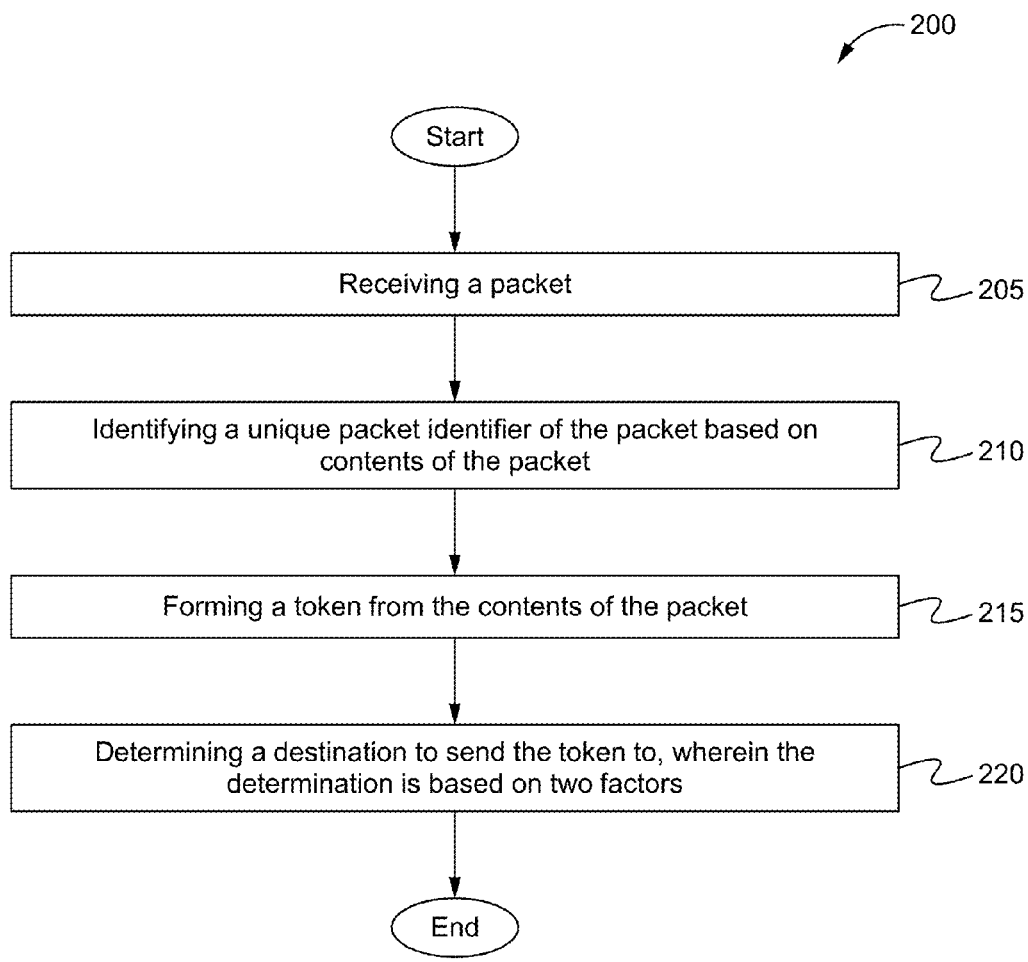
FIGS. 2A-2B illustrate a method of a network chip in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus of identifying internal destinations of network packets relate to a network chip that allows flexibility in handling packets. The handling of packets can be a function of what the packet contents are or where the packets are from. The handling of packets can also be a function of both what the packet contents are and where the packets are from. In some embodiments, where the packets are from refers to unique port numbers of chip ports that the packets arrived at. The packets can be distributed for processing within the network chip.

A network device, such as a network switch, is able to switch/route network traffic. The network switch includes a plurality of switch ports for receiving and transmitting packets. The plurality of switch ports includes switch input ports and switch output ports. The network switch also includes at least one network chip. Each network chip includes a plurality of chip ports. The plurality of chip ports are typically mapped to the plurality of switch input ports.

The network switch also includes at least one memory. In some embodiments, the memory stores a protocol table, which includes layer information of each protocol layer of each protocol layer combination that is programmed into the protocol table. In some embodiments, the memory also stores a destination table, which includes internal destination information. The protocol table and the destination table are programmable. In some embodiments, the at least one memory is an on-chip memory that is located on the network chip.

In some embodiments, the network chip includes a parser and a rewriter. The parser can include one or more parser engines to identify contents of network packets, and the rewriter can include one or more rewrite engines to modify packets before they are transmitted out via the switch output ports of the network switch. The parser engine(s) and the rewrite engine(s) are flexible and operate on a programmable basis.

In some embodiments, the network chip also include a mesh network of lookup and decision engines (LDEs). An exemplary mesh network of LDEs is discussed in U.S. patent application Ser. No. 14/144,260, entitled "Method and Apparatus for Parallel and Conditional Data Manipulation in a Software-Defined Network Processing Engine," filed on Dec. 30, 2013, and U.S. patent application Ser. No. 14/144,270, entitled "Apparatus and Method of Generating Lookups and Making Decision for Packet Modifying and Forwarding in a Software-Defined Network Engine," filed on Dec. 30, 2013, which are hereby incorporated by reference in their entirety. Each LDE receives a token from the parser or from another LDE, and generates a lookup key and sends the lookup key to a remote search engine. The remote search engine returns a lookup result, which is used by the LDE to modify the token.

Packets typically include multiple protocol layers. Each protocol layer carries different information. Some examples of well known layers are:
Ethernet
PBB Ethernet
ARP
IPV4
IPV6
MPLS
FCOE
TCP
UDP
ICMP
IGMP
GRE
ICMPv6
VxLAN
TRILL
CNM Theoretically, the protocol layers can occur in any order. However, only some well-known combinations of these layers occur. Some examples of valid combinations of these layers are:
Ethernet
Ethernet, ARP
Ethernet, CNM
Ethernet, FCoE
Ethernet, IPV4
Ethernet, IPV4, ICMP
Ethernet, IPV4, IGMP In some embodiments, the network switch supports 17 protocols and eight protocol layers. There are therefore $8^{17}$ possible protocol layer combinations. FIG. 1 illustrates exemplary protocol layer combinations of packets. For example, a packet can include a three protocol layer combination such as Ethernet, IPv4 and ICMP. For another example, a packet can include a seven protocol layer combination such as, Ethernet, IPv4, UDP, VxLAN, Ethernet and ARP.

Although there are $8^{17}$ possible protocol layer combinations, only some well-known combinations of these layers occur. All known protocol layer combinations are uniquely identified and translated into a unique number called the packet identifier (PktID). The protocol table stored in the memory of the network switch is programmed to include layer information of each layer of each known protocol layer combination. In practice, the local protocol table includes less than 256 protocol layer combinations. In some embodiments, this local protocol table includes 212 known protocol layer combinations. The local protocol table is programmed to include more or less protocol layer combinations.

Each packet received at the network chip is processed by the parser to identify the packet using the PktID as well as to form a token. The token includes extracted fields from parsed headers of the packet. In some embodiments, the token also includes control bits. An exemplary token formation is discussed in U.S. patent application Ser. No. 14/309,726, entitled "A Method of Extracting Data from Packets and an Apparatus thereof," filed Jun. 19, 2014, which is hereby incorporated by reference in its entirety.

A combination of the PktID and certain bits of the port number (of the corresponding arrival port of the packet) is used to decide where the token of the packet is internally sent to for processing. This combination allows the flexibility that all packets of a particular type can be sent to the same internal destination within the network chip for processing irrespective of which port they are from. Similarly, this combination allows the flexibility that all traffic from a particular port can be redirected to the same internal destination within the network chip for processing independent of what kind of traffic it is.

In some embodiments, the port number is a relative port number that is assigned to the arrival port. The assignment can be performed using a dynamic port renumbering scheme. An exemplary dynamic port renumbering scheme is discussed in U.S. patent application Ser. No. 14/309,789, entitled "A Method of Dynamically Renumbering Ports and an Apparatus thereof," filed Jun. 19, 2014, which is hereby incorporated by reference in its entirety. The dynamic port renumbering scheme limits a number of states that needs to be preserved for all ports on the network chip, thereby advantageously minimizing the total logic on the network chip.

Typically, the combination of the PktID and the certain bits of the port number forms a key. The key is used to perform a lookup against the destination table. The destination table maps keys to internal destinations within the network chip. The destination table is typically software defined. In some embodiments, the combination is a concatenation of the PktID and the certain bits of the port number.

An exemplary internal destination is one of the LDEs in the mesh network on the network chip. The token is typically in a format that is understood by the LDEs such that one or more of the LDEs will be able to process the token. In some embodiments, the token is modified by a destination LDE. Thereafter, the modified token can be sent to another LDE or to the same LDE for further modification. In some embodiments, the final modified token is used by the rewriter to modify packet headers of the corresponding packet. The original packet payload and the modified packet headers are combined to form a final output network packet. The final output network packet is then sent back to the parser (loopback) or is forwarded to another network device.

FIG. 2A illustrates a method 200 of the network chip in accordance with some embodiments of the present invention. Typically, the network chip is a part of the network switch. At a step 205, a packet is received.

At a step 210, a unique packet identifier of the packet is identified based on contents of the packet. In some embodiments, the step 210 is performed by the parser on the network chip.

At a step 215, a token is formed from the contents of the packet. In some embodiments, the step 215 is also performed by the parser. In some embodiments, protocol layers of the packet are first identified. Each of the protocol layers is then expanded to a generic format based on the identification of the protocol layer. Contents from the expanded protocol layers are then selected. The selected contents are thereafter concatenated to form the token.

At a step 220, a destination to send the token to is determined. The determination is typically based on two factors. In some embodiments, the destination is an internal destination within the network chip. In some embodiments, the step 220 includes a method discussed in FIG. 2B.

Figure 2B:
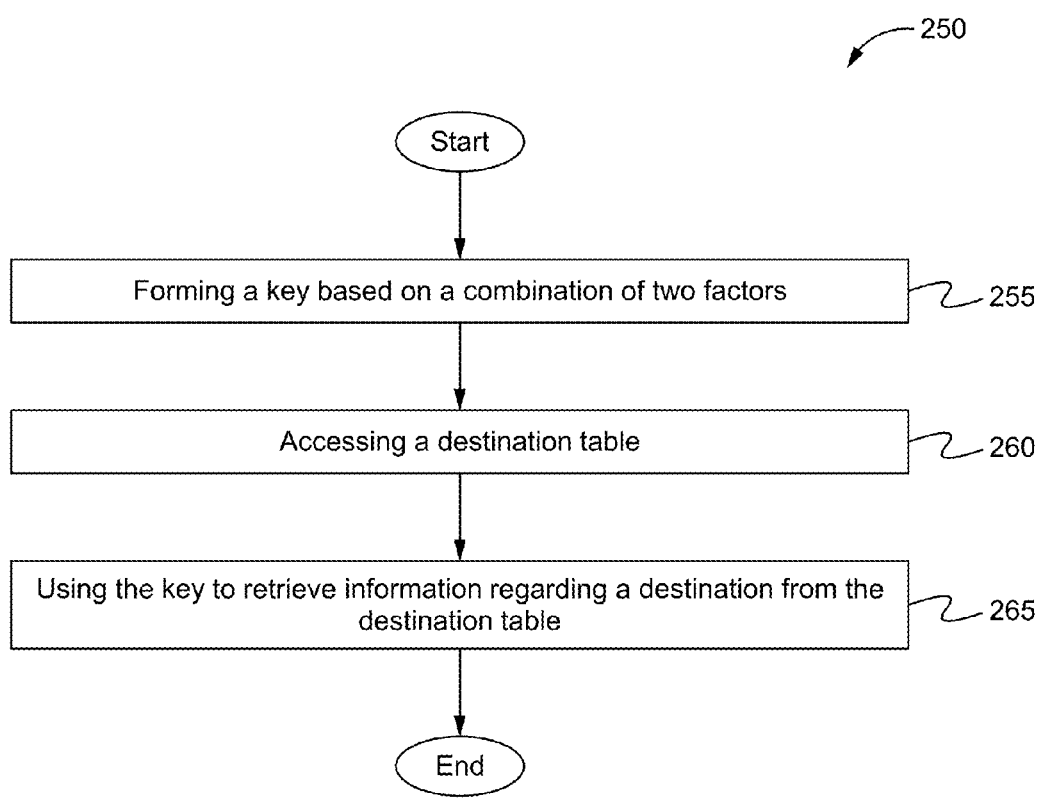

FIG. 2B illustrates the method 250 in accordance with some embodiments of the present invention. At a step 255, a key is formed based on a combination of the two factors. In some embodiments, one factor is what the contents of the packet are, and another factor is where the packet is from. Where the packet is from refers to a unique port number of the chip port that the packet arrived at.

In some embodiments, the combination of the two factors allows all packets of a particular type to be sent to the same internal destination within the network chip for processing irrespective of which chip ports the packets are from. In some embodiments, the combination of the two factors allows all traffic from one chip port to be redirected to the same internal destination within the network chip for processing independent of what kind of traffic it is.

At a step 260, a destination table is accessed. The destination table includes information regarding destinations.

At a step 265, the key is used to retrieve information regarding the destination from the destination table. In some embodiments, the destination is an internal destination on the network chip. In some embodiments, the destination is one of a plurality of LDEs on the network chip.

Figure 3:
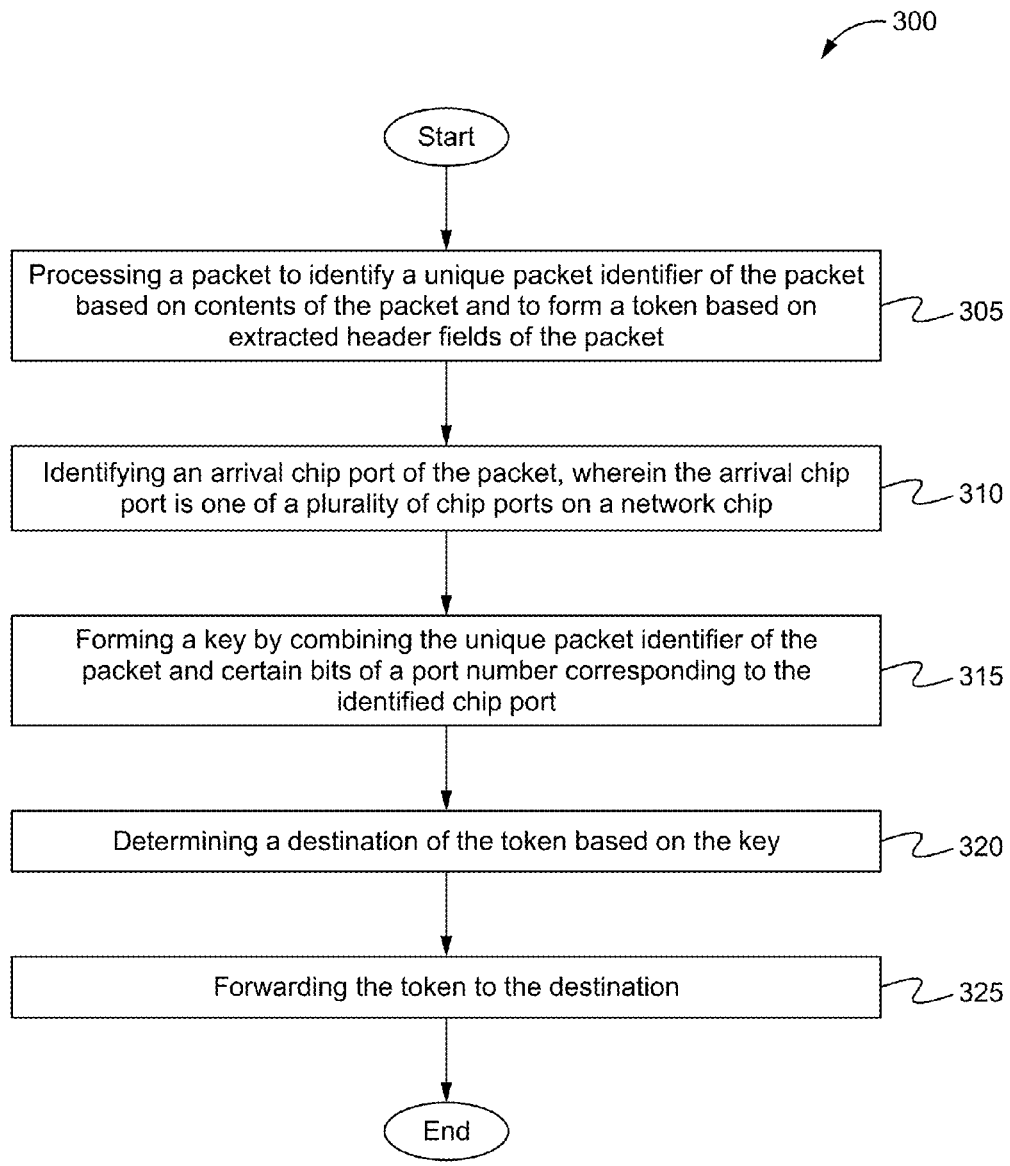
FIG. 3 illustrates another method of the network chip in accordance with some embodiments of the present invention.

FIG. 3 illustrates another method 300 of the network chip in accordance with some embodiments of the present invention. At a step 305, a packet is processed to identify a unique packet identifier of the packet based on contents of the packet and to form a token based on extracted header fields of the packet.

At a step 310, an arrival chip port of the packet is identified. The arrival chip port is one of the plurality of chip ports on the network chip.

At a step 315, a key is formed by combining the unique packet identifier of the packet and certain bits of a port number corresponding to the identified chip port. In some embodiments, the port number is a relative port number that is assigned to the identified port. In some embodiments, the assignment is performed using a dynamic port renumbering scheme. In some embodiments, the combination is a concatenation of the PktID and the certain bits of the port number.

At a step 320, a destination of the token is determined based on the key. In some embodiments, a destination table is referenced and the key is used to retrieve information regarding the destination from the destination table. In some embodiments, the destination is an internal destination within the network chip.

At a step 325, the token is forwarded to the destination.

Unlike prior art network chips, the network chip in accordance with some embodiments of the present invention does not blindly extract contents from a packet to determine a destination of the packet. Instead, the handling of each packet is a function of what contents of the packets are and where the packets are from. As such, all packets of a same packet type can be sent to the same internal destination within the network chip for processing irrespective of which of the plurality of chip ports the packets are from. Similarly, all traffic from one of the plurality of chip ports can be redirected to the same internal destination within the network chip for processing independent of what kind of traffic the traffic is. Processing of the packets can thus be advantageously distributed across the LDEs.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of implementing a network chip, comprising:
   receiving a packet through an ingress port of the network chip;
   identifying a unique packet identifier of the packet based on contents of the packet, wherein the unique packet identifier corresponds to a combination of protocol layers that form a header of the packet;
   forming a token from the contents of the packet; and
   determining an internal destination within the network chip to send the token to, wherein the determination is based on two factors, wherein one of the factors is a port number of the ingress port and another one of the factors is the unique packet identifier.

2. The method of claim 1, wherein forming a token includes:
   identifying protocol layers of the packet;
   expanding each of the protocol layers to a generic format based on the identification of the protocol layer;
   selecting contents from the expanded protocol layers; and
   concatenating the selected contents to form the token.

3. The method of claim 1, wherein determining a destination includes:
   forming a key based on a combination of the two factors;
   accessing a destination table; and
   using the key to retrieve information regarding the destination from the destination table.

4. The method of claim 1, wherein the destination is an internal destination on the network chip.

5. The method of claim 1, wherein the destination is one of a plurality of lookup and decision engines (LDEs) on the network chip.

6. The method of claim 1, wherein one of the factors is what the contents of the packet are.

7. The method of claim 1, wherein one of the factor is where the packet is from.

8. The method of claim 1, wherein a combination of the two factors allows all packets of a particular type to be sent to the same destination for processing irrespective of which chip ports the packets are from.

9. The method of claim 1, wherein a combination of the two factors allows all traffic from one chip port to be redirected to the same destination for processing independent of what kind of traffic it is.

10. A method of implementing a network chip, comprising:
    processing a packet to identify a unique packet identifier of the packet based on contents of the packet and to form a token based on extracted header fields of the packet, wherein the unique packet identifier corresponds to a combination of protocol layers that form a header of the packet;
    identifying a port number of an arrival chip port of the packet, wherein the arrival chip port is one of a plurality of chip ports on the network chip;
    forming a key by combining the unique packet identifier of the packet and certain bits of the port number corresponding to the identified chip port;
    determining an internal destination of the token within the network chip based on the key; and
    forwarding the token to the destination.

11. The method of claim 10, wherein the port number is a relative port number that is assigned to the identified port.

12. The method of claim 11, wherein the assignment is performed using a dynamic port renumbering scheme.

13. The method of claim 10, wherein the combination of the unique packet identifier of the packet and the certain bits of the port number is a concatenation of the unique packet identifier of the packet and the certain bits of the port number.

14. The method of claim 10, wherein determining a destination includes referencing a destination table and using the key to retrieve information regarding the destination from the destination table.

15. A network chip comprising:
    a plurality of chip ports, wherein each of the ports is associated with a port number;
    on-chip memory to store a destination table; and
    a parser to:
        process a packet that arrived at one of the plurality of chip ports to thereby identify a unique packet identifier of the packet and form a token that includes extracted fields from different protocol layers of the packet, wherein the unique packet identifier corresponds to a combination of the protocol layers that form a header of the packet;
        decide where to send the token to within the network chip based on the port number of the one of the ports from which the packet arrived and the unique packet identifier; and
        forward the token according to the decision.

16. The network chip of claim 15, wherein the decision is based on referencing the destination table.

17. The network chip of claim 15, wherein the unique packet identifier and certain bits of the port number are concatenated to form a key to be used when retrieving destination information from the destination table.

18. The network chip of claim 15, wherein the destination table is programmable.

19. The network chip of claim 15, further comprising a mesh network of lookup and decision engines (LDEs).

20. The network chip of claim 19, wherein the token is in a format that is understood by the LDEs such that one or more of the LDEs will be able to process the token.

21. The network chip of claim 19, wherein each of the LDEs generates a lookup key and sends the lookup key to a remote search engine, wherein the remote search engine returns a lookup result that is used to modify the token.

22. The network chip of claim 19, wherein the token is forwarded to a destination LDE, wherein the destination LDE is one of the LDEs.

23. The network chip of claim 22, wherein the destination LDE modifies the token.

24. The network chip of claim 23, wherein the modified token is forwarded to another LDE or the same LDE for further modification.

25. The network chip of claim 24, wherein a final modified token is used to modify packet headers of the packet.

26. The network chip of claim 25, wherein the modified packet headers are combined with a payload of the packet to form an output packet.

27. The network chip of claim 26, wherein the output packet is sent back to the parser for further processing.

28. A network switch comprising:
   a plurality of switch ports; and
   a network chip including:
      a plurality of chip ports that is mapped to the plurality of switch ports; and
      a parser to determine how to handle to incoming packets, wherein the handling includes determining a unique packet identifier of one of the incoming packets and a port number of one of the chip ports from which the one of the incoming packets is received, and further wherein the handling is a function of what contents of the packets are and where the packets are from such that two conditions are always met, wherein the unique packet identifier corresponds to a combination of protocol layers that form a header of the one of the incoming packets.

29. The network switch of claim 28, wherein one of the two conditions is all packets of a same packet type are sent to a first destination for processing irrespective of which of the plurality of chip ports the packets are from, and another of the two conditions is all traffic from one of the plurality of chip ports is redirected to a second destination for processing independent of what kind of traffic the traffic is.

30. The network switch of claim 28, wherein the parser processes a packet that arrived at one of the plurality of chip ports to thereby identify the unique packet identifier of the packet and form a token that includes extracted fields from different protocol layers of the packet.

31. The network switch of claim 30, wherein the parser further decides where to send the token to and forwards the token according to the decision.

* * * * *